(12) United States Patent
Sugino et al.

(10) Patent No.: US 12,125,610 B2
(45) Date of Patent: Oct. 22, 2024

(54) GROMMET AND WIRE HARNESS

(71) Applicant: YAZAKI CORPORATION, Tokyo (JP)

(72) Inventors: Junki Sugino, Shizuoka (JP); Sadao Mori, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 220 days.

(21) Appl. No.: 18/074,918

(22) Filed: Dec. 5, 2022

(65) Prior Publication Data

US 2023/0178271 A1 Jun. 8, 2023

(30) Foreign Application Priority Data

Dec. 6, 2021 (JP) .................................. 2021-197479
Mar. 14, 2022 (JP) .................................. 2022-039020

(51) Int. Cl.
*H01B 17/58* (2006.01)

(52) U.S. Cl.
CPC .................................. *H01B 17/583* (2013.01)

(58) Field of Classification Search
CPC .............................. H01B 17/58; H01B 17/583
USPC ........................................................ 174/650
See application file for complete search history.

(56) References Cited

U.S. PATENT DOCUMENTS

2003/0015338 A1  1/2003 Sato

FOREIGN PATENT DOCUMENTS

| JP | 2001-258133 A | 9/2001 |
| JP | 2001-258134 A | 9/2001 |
| JP | 2012-239321 A | 12/2012 |
| JP | 6105651 B2 | 3/2017 |

*Primary Examiner* — Tremesha W Burns
(74) *Attorney, Agent, or Firm* — Sughrue Mion, PLLC

(57) ABSTRACT

A grommet body of a grommet includes: a large-diameter tubular portion; a first small-diameter tubular portion arranged on one side of a through-hole; and a second small-diameter tubular portion arranged on another side of the through-hole. The grommet body includes an umbrella-like sound insulation portion which covers the through-hole from another side, and the sound insulation portion is configured such that an abutting side surface is folded back in such a way as to face a radial outer side of the grommet body with a folded-back portion as a base point. The sound insulation portion in a state in which the abutting side surface is folded back in such a way as to face the radial outer side of the grommet body has a pleated shape, and an outer diameter of the sound insulation portion in this state is smaller than an inner diameter of the through-hole.

7 Claims, 14 Drawing Sheets

GROMMET AND WIRE HARNESS

CROSS REFERENCE TO RELATED APPLICATION

The present application is based on, and claims priority from the prior Japanese Patent Applications No. 2021-197479, filed on Dec. 6, 2021, and No. 2022-039020, filed on Mar. 14, 2022, the entire contents of which are incorporated herein by reference.

TECHNICAL FIELD

The disclosure relates to a grommet and a wire harness.

BACKGROUND

When an electric wire penetrates through a through-hole formed in advance in a plate material, there is a conventionally known grommet which is attached to the peripheral edge of the through-hole to protect the electric wire from the peripheral edge of the through-hole. JP2012-239321A discloses a technique relating to a grommet provided with a grommet body to hold an electric wire when the electric wire penetrates through a through-hole provided in a vehicle body panel serving as a member to which attachment is performed. The grommet body is provided with an umbrella-like portion (umbrella-like sound insulation portion) extending from the outer periphery portion of a tubular wire harness support to a panel attaching portion, which is a portion that attaches to the vehicle body panel. With the provision of this umbrella-like portion, the grommet is configured to suppress sound leakage around the portion which attaches to the through-hole of the vehicle body panel.

SUMMARY

In the grommet disclosed in JP2012-239321A, the outer diameter of the umbrella-like portion that suppresses sound leakage is larger than the inner diameter of the through-hole through which the electric wire penetrates, and thus the umbrella-like portion interferes with the member to which attachment is performed when the grommet is attached to the peripheral edge of the through-hole, resulting in poor workability when the grommet is attached to the peripheral edge of the through-hole.

The present disclosure has been made in view of this kind of problem in such conventional techniques. An object of the present disclosure is to provide a grommet which is capable of suppressing interference with a member to which attachment is performed when the grommet is attached to the peripheral edge of a through-hole and thus is advantageous in improving the workability when the grommet is attached to the peripheral edge of the through-hole, and to provide a wire harness using the grommet.

A grommet according to the embodiments is provided with a grommet body for holding, at an inner periphery side, an electric wire penetrating through a through-hole provided in a member to which attachment is performed, and the grommet body includes: a large-diameter tubular portion locked to a peripheral edge of the through-hole; a first small-diameter tubular portion arranged on one side of an opening of the through-hole; a second small-diameter tubular portion arranged on another side of the opening of the through-hole; and an umbrella-like sound insulation portion which extends from an inner peripheral side to an outer peripheral side of the grommet body and covers the opening of the through-hole from another side. The sound insulation portion is configured such that an inner-side surface of the sound insulation portion is folded back in such a way as to face a radial outer side of the grommet body with a folded-back portion as a base point, and the sound insulation portion in a state in which the inner-side surface of the sound insulation portion is folded back in such a way as to face the radial outer side of the grommet body has a pleated shape having a plurality of pleats in a circumferential direction, and an outer diameter of the sound insulation portion in this state is smaller than an inner diameter of the through-hole.

A wire harness according to the embodiments includes the grommet described above.

The above configuration makes it possible to provide a grommet which is capable of suppressing interference with a member to which attachment is performed when the grommet is attached to the peripheral edge of a through-hole and thus is advantageous in improving the workability when the grommet is attached to the peripheral edge of the through-hole, and to provide a wire harness using the grommet.

DETAILED DESCRIPTION

Various embodiments will be described hereinafter with reference to the accompanying drawings.

Hereinafter, a grommet according to the embodiments will be described in detail with reference to the drawings.

Dimension ratios of the drawings are exaggerated for convenience of explanation, and may be different from actual ratios.

First Embodiment

Figure 1:
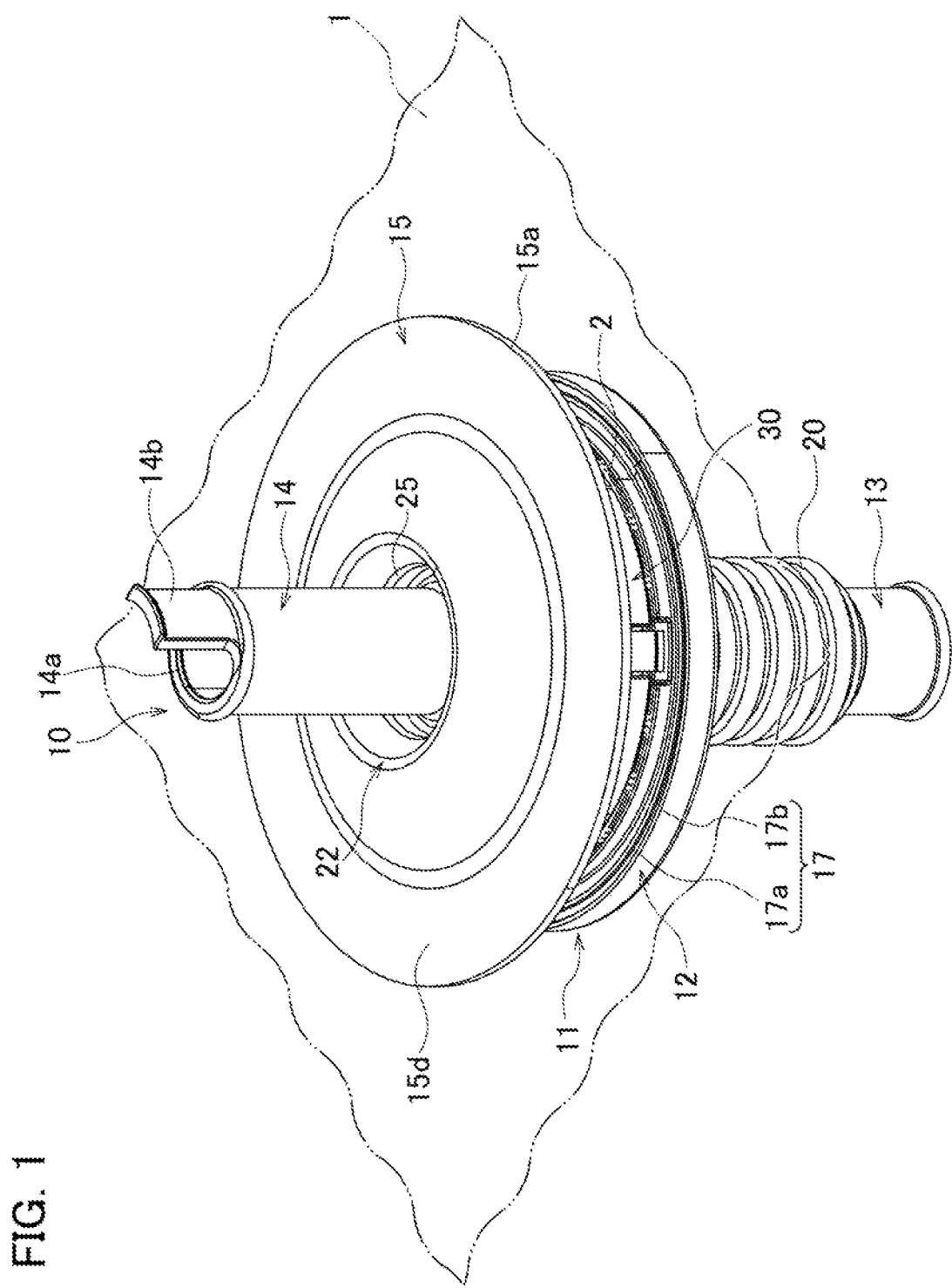
FIG. 1 is a perspective view illustrating an example of a grommet according to a first embodiment.
Figure 2:
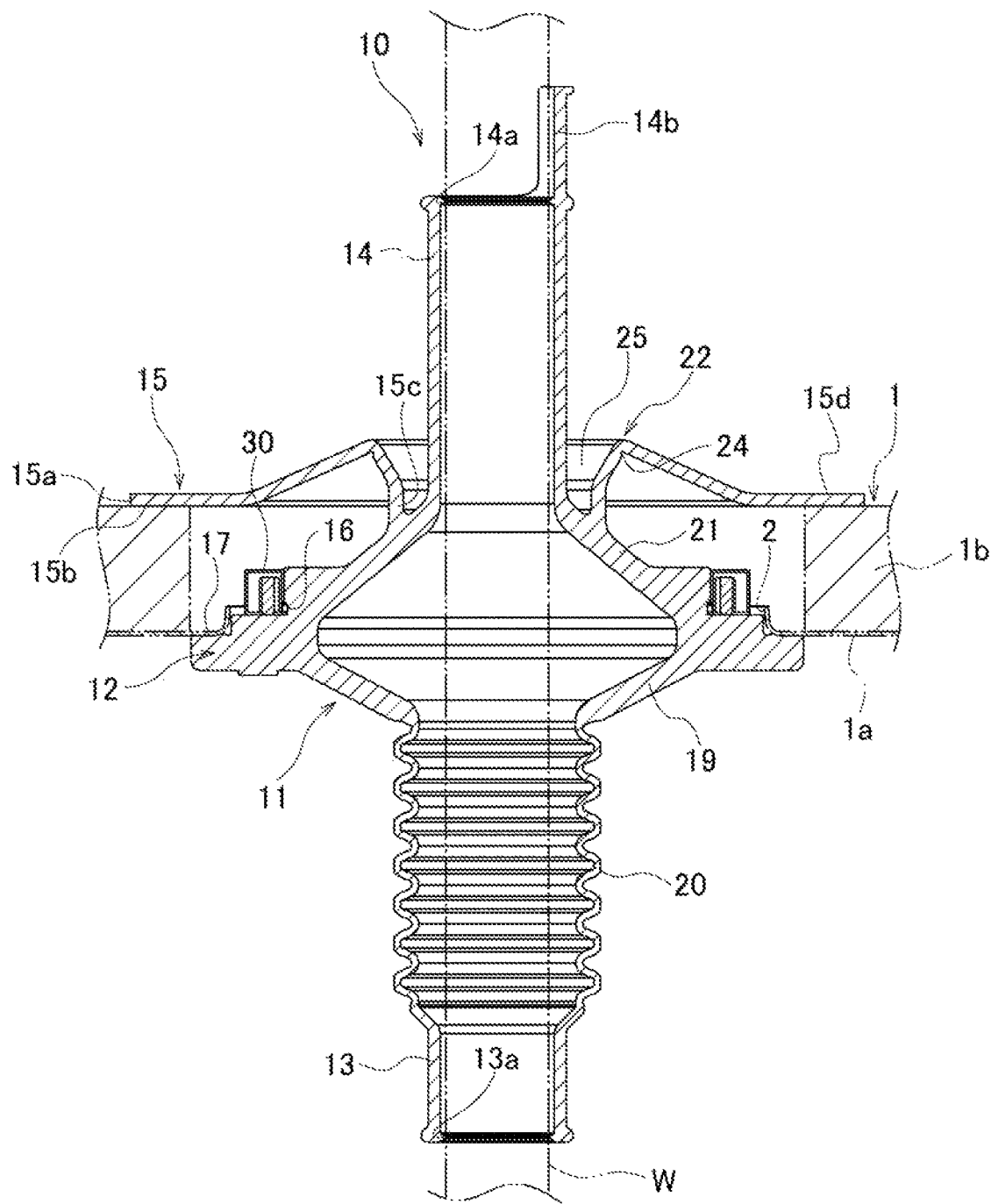
FIG. 2 is a cross-sectional view of the grommet according to the first embodiment.

FIG. 1 is a perspective view of a grommet 10 according to the first embodiment, and FIG. 2 is a cross-sectional view of the grommet 10 according to the first embodiment. As an example, the grommet 10 is attached to the peripheral edge of a through-hole 2 formed in advance in a vehicle body panel 1 serving as a member to which attachment is performed, and protects an electric wire W, which penetrates through the through-hole 2, from the peripheral edge of the through-hole 2. The opening shape of the through-hole 2 is circular in the present embodiment. The electric wire W may be a wire harness as a wire assembly. In the following description, the upper side refers to the side in the direction toward the through-hole 2 when the grommet 10 is attached to the peripheral edge of the through-hole 2, and the lower side refers to the opposite side thereof.

The vehicle body panel 1 includes, as an example, a panel 1a arranged on one side of the vehicle body panel 1 (engine room side) and an insulator 1b (sound insulation material) arranged on the other side of the vehicle body panel 1 (vehicle interior side).

Figure 3:
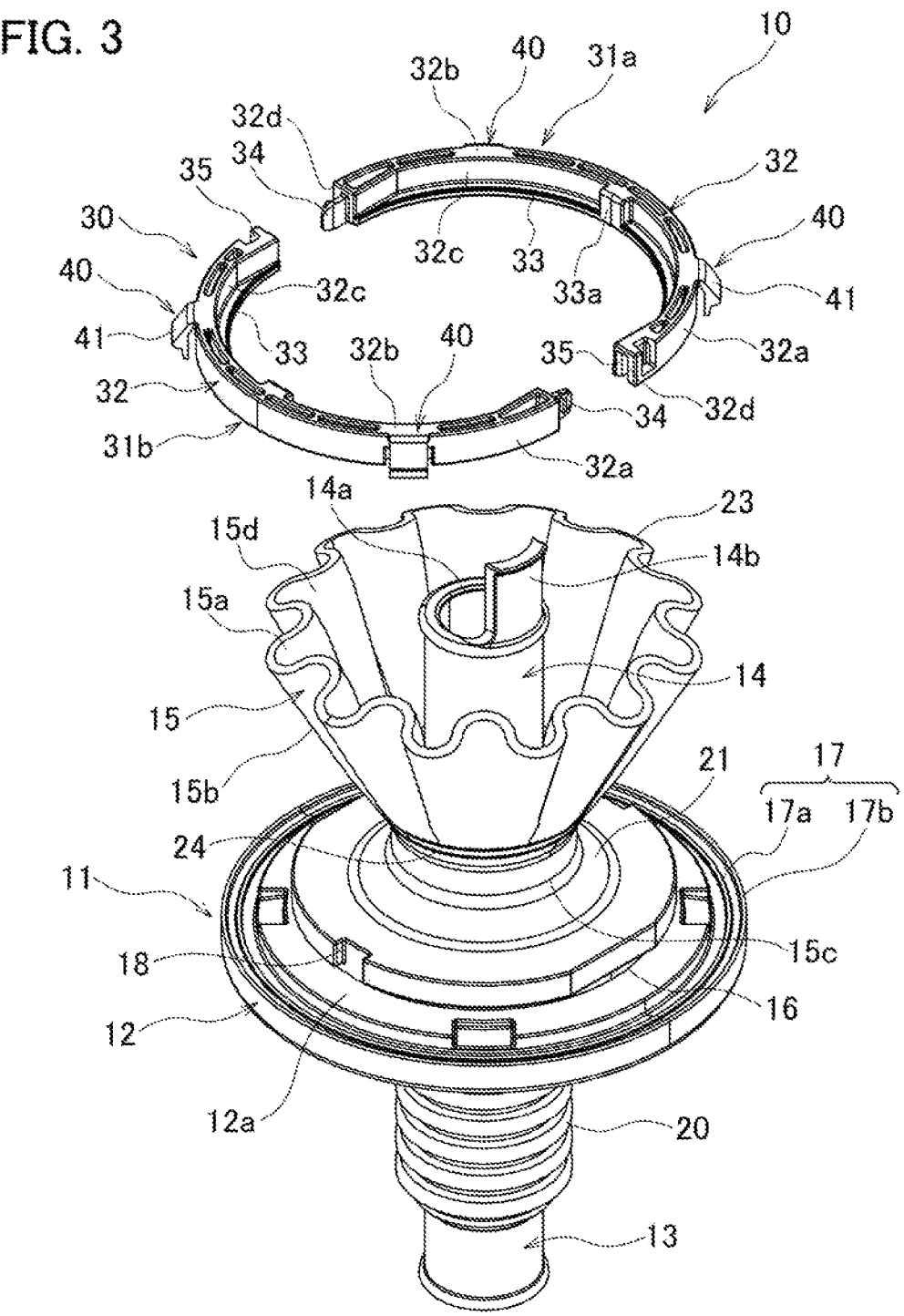
FIG. 3 is an exploded view of the grommet according to the first embodiment.

FIG. 3 is an exploded view of the grommet 10. The grommet 10 is provided with a grommet body 11 and an inner protector 30. In addition, the grommet body 11 may be attached directly to the peripheral edge of the through-hole 2 without connecting the inner protector 30 to the grommet body 11.

The grommet body 11 is a tubular member that holds the electric wire W arranged on the inner peripheral side. The grommet body 11 is formed of a flexible material such as a rubber material. The grommet body 11 includes a large-diameter tubular portion 12, a first small-diameter tubular portion 13, a second small-diameter tubular portion 14, and a sound insulation portion 15.

The inner protector 30 is connected to the large-diameter tubular portion 12. The outer diameter of the large-diameter tubular portion 12 is larger than the opening diameter of the through-hole 2. The large-diameter tubular portion 12 includes a fitting groove 16 and a lip 17.

The fitting groove 16 is annularly formed on the outer peripheral side of the large-diameter tubular portion 12, and when the inner protector 30 is connected to the large-diameter tubular portion 12, flanges 33 of the inner protector 30 are fitted into the fitting groove 16. In addition, a recess 18 engaging with a convex portion 33a formed in some of the flanges 33 may be provided in a part of the fitting groove 16.

The lip 17 is an annular seal and protrudes to the vehicle body panel 1 side from an outer peripheral edge surface 12a opposite to the vehicle body panel 1. The lip 17 may be constituted of an inner peripheral lip 17a and an outer peripheral lip 17b. When the grommet 10 is attached to the peripheral edge of the through-hole 2, the inner peripheral lip 17a and the outer peripheral lip 17b elastically deform in the direction of collapsing to the outer peripheral edge surface 12a side and adhere to the peripheral edge surface of the through-hole 2 provided on one surface of the vehicle body panel 1. This prevents water or the like from entering from the outer side to the inner side of the grommet 10 via a space between the lip 17 and the surface of the vehicle body panel 1 opposite to the lip 17.

The first small-diameter tubular portion 13 is continuous with the side of the large-diameter tubular portion 12 which is opposite to the side which opposes the vehicle body panel 1, via a first enlarging-diameter tubular portion 19 and a bellows-like tube 20, and holds the electric wire W on the inner peripheral side. The first small-diameter tubular portion 13 is arranged on one side of the opening of the through-hole 2 (engine room side), and has an inner surface in contact with the outer peripheral surface of the electric wire W over a predetermined length. The inner diameter of the first small-diameter tubular portion 13 is smaller than the inner diameter of the large-diameter tubular portion 12, and slightly smaller than the outer diameter of the electric wire W or almost equal to the outer diameter of the electric wire W. This prevents water or the like from entering from the outer side to the inner side of the grommet 10 via a space between the inner surface of the first small-diameter tubular portion 13 and the outer peripheral surface of the electric wire W. The first small-diameter tubular portion 13 is formed of a flexible material, and thus the first small-diameter tubular portion 13 deforms according to a change of the position of the electric wire W. In addition, an annular first seal 13a may be provided on the inner peripheral surface of the first small-diameter tubular portion 13, and the annular first seal 13a is configured to close the gap between the inner peripheral surface of the first small-diameter tubular portion 13 and the electric wire W.

The second small-diameter tubular portion 14 is continuous with the side of the large-diameter tubular portion 12 which opposes the vehicle body panel 1, via a second enlarging-diameter tubular portion 21, and holds the electric wire W on the inner peripheral side. The second small-diameter tubular portion 14 is arranged on the other side of the opening of the through-hole 2 (vehicle interior side), and has an inner surface in contact with the outer peripheral surface of the electric wire W over a predetermined length. The inner diameter of the second small-diameter tubular portion 14 is smaller than the inner diameter of the large-diameter tubular portion 12, and slightly smaller than the outer diameter of the electric wire W or almost equal to as the outer diameter of the electric wire W. This prevents water or the like from entering from the outer side to the inner side of the grommet 10 via a space between the inner surface of the second small-diameter tubular portion 14 and the outer peripheral surface of the electric wire W. The second small-diameter tubular portion 14 is formed of a flexible material, and thus the second small-diameter tubular portion 14 deforms according to a change of the position of the electric wire W. In addition, an annular second seal 14a may be provided on the inner peripheral surface of the second small-diameter tubular portion 14, and the annular second seal 14a is configured to close the gap between the inner peripheral surface of the second small-diameter tubular portion 14 and the electric wire W. Further, a tongue piece portion 14b for tape winding may provide an extension at the tip of the second small-diameter tubular portion 14.

The sound insulation portion 15 is formed in an umbrella-like or a flange-like shape on the outer peripheral side of the second enlarging-diameter tubular portion 21 and extends from the inner peripheral side to the outer peripheral side of the grommet body 11. That is, the sound insulation portion 15 is formed in an umbrella-like or a flange-like shape extending from the outer surface of the second enlarging-diameter tubular portion 21. When the grommet 10 is attached to the peripheral edge of the through-hole 2 and the sound insulation portion 15 is expanded as illustrated in FIG. 1 and FIG. 2, an outer peripheral edge 15a provided at the tip of the sound insulation portion 15 adheres to the peripheral edge surface of the through-hole 2 provided on the other surface of the vehicle body panel 1. That is, the outer diameter of the sound insulation portion 15 in a state in which the sound insulation portion 15 is expanded as illustrated in FIG. 1 and FIG. 2 is larger than the opening diameter of the through-hole 2. As a result, a closed sound insulation space is formed between the sound insulation portion 15 and the peripheral edge of the through-hole 2, and thus it is possible to suppress the transmission of sound (sound leakage) entering the vehicle interior from the engine room via the space between the vehicle body panel 1, the sound insulation portion 15 and the peripheral edge of the through-hole 2. The sound insulation portion 15 may also be formed in an umbrella-like or a flange-like shape extending from the outer surface of the second small-diameter tubular portion 14.

Figure 4:
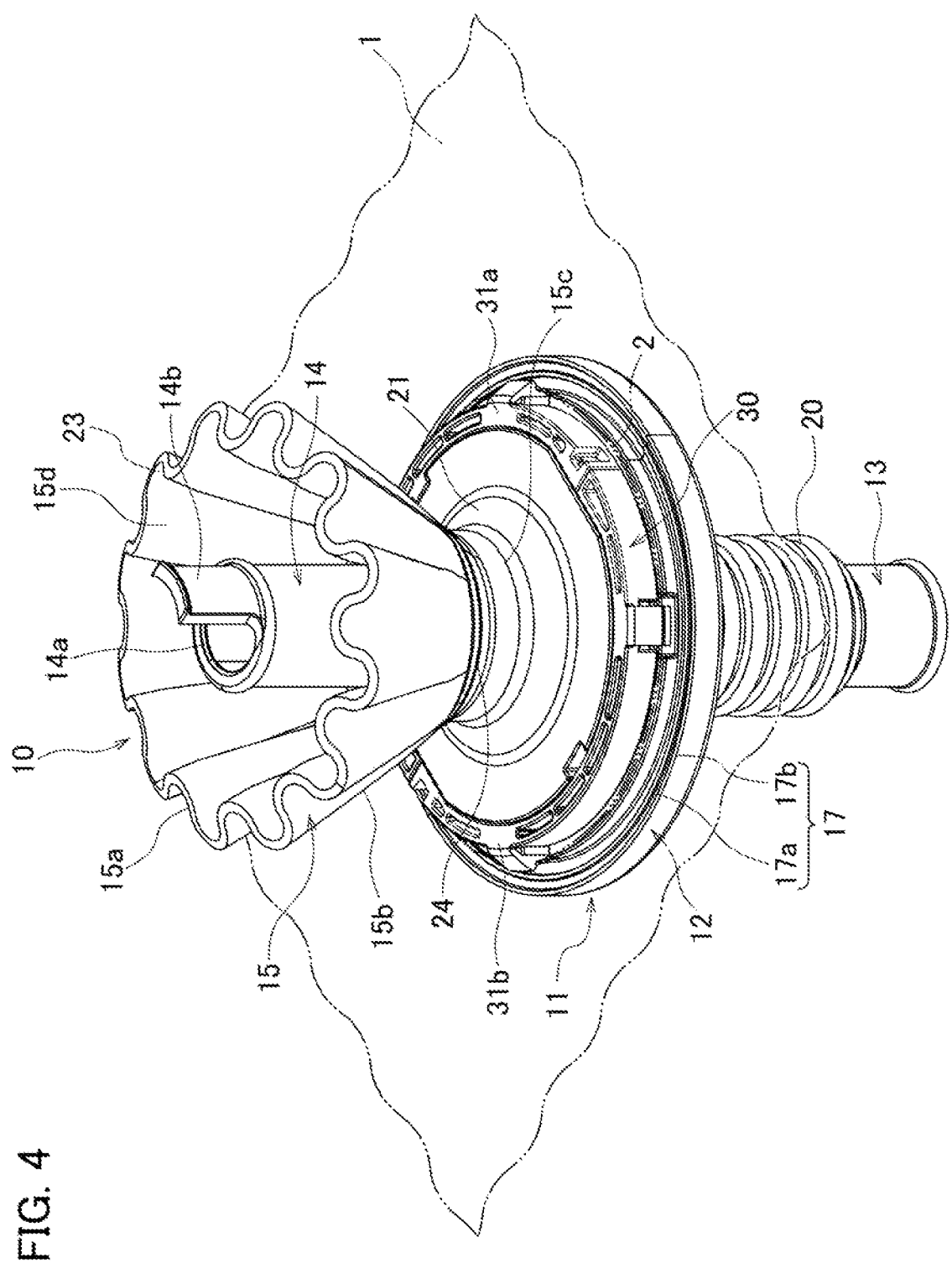
FIG. 4 is a perspective view illustrating a state in which an umbrella-like sound insulation portion in the first embodiment is folded back.
Figure 5:
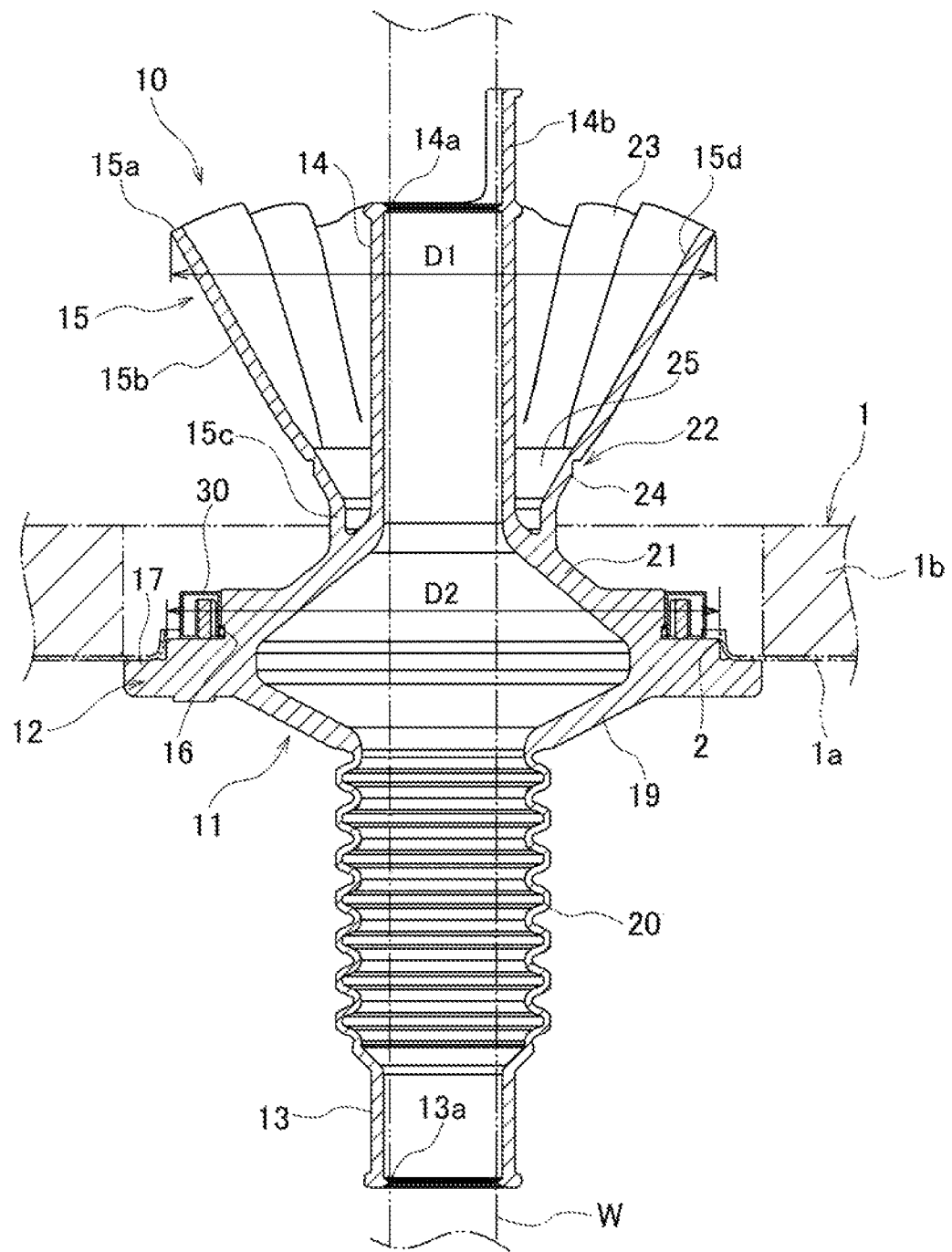
FIG. 5 is a cross-sectional view illustrating a state in which the umbrella-like sound insulation portion in the first embodiment is folded back.

FIG. 4 is a perspective view illustrating a state in which the umbrella-like sound insulation portion 15 in the first embodiment is contracted from an expanded state, and FIG. 5 is a cross-sectional view illustrating the state in which the umbrella-like sound insulation portion 15 in the first embodiment is contracted from the expanded state.

In the present embodiment, the umbrella-like sound insulation portion 15 is configured such that the sound insulation portion 15 is able to be folded back in such a way that an abutting side surface 15*b* of the sound insulation portion 15 faces the radial outer side of the grommet body 11 with a fold-back portion 22 as a base point. Out of the front and back surfaces of the sound insulation portion 15, the abutting side surface 15*b* is an inner-side surface which abuts on the peripheral edge of the through-hole 2. The sound insulation portion 15 in a state in which the abutting side surface 15*b* of the sound insulation portion 15 is folded back in such a way as to face the radial outer side of the grommet body 11 has a pleated shape having a plurality of pleats 23 in the circumferential direction, and an outer diameter D1 of the sound insulation portion 15 in this state is smaller than an inner diameter D2 of the through-hole 2 (D1<D2). In order to make the position where the abutting side surface 15*b* of the sound insulation portion 15 is folded to be high with respect to the outer peripheral edge 15*a*, the fold-back portion 22 is provided at a position further away from the vehicle body panel 1 than the outer peripheral edge 15*a* of the sound insulation portion 15 in the length direction of the grommet body 11 in a state that the sound insulation portion 15 is not folded back as shown in FIG. 2. The fold-back portion 22 also includes a fold-back groove 24 formed along the circumferential direction in the abutting side surface 15*b* of the sound insulation portion 15. That is, the fold-back groove 24 is provided in the abutting side surface 15*b* of the sound insulation portion 15 in order to make a part of the abutting side surface 15*b* of the sound insulation portion 15 thin and then to make it easier to be folded in a direction toward the peripheral edge surface of the through-hole 2. Meanwhile, an inner peripheral edge 15*c*, which is a connection portion with the second enlarging-diameter tubular portion 21 in the sound insulation portion 15, is provided at a low position with respect to the outer peripheral edge 15*a*. When the grommet 10 is attached to the peripheral edge of the through-hole 2, the inner peripheral edge 15*c*, which is provided at the base end of the sound insulation portion 15, may be partially positioned inside the through-hole 2.

In the present embodiment, an annular groove 25 is formed along the circumferential direction of the grommet body 11 between the outer surface of the second enlarging-diameter tubular portion 21 and a non-abutting side surface 15*d* of the sound insulation portion 15. Out of the front and back surfaces of the sound insulation portion 15, the non-abutting side surface 15*d* is an outer-side surface, which is the surface opposite to the inner-side surface (abutting side surface 15*b*). When the sound insulation portion 15 is formed in such a way as to extend from the outer surface of the second small-diameter tubular portion 14, the annular groove 25 may be formed between the outer surface of the second small-diameter tubular portion 14 and the non-abutting side surface 15*d* of the sound insulation portion 15.

In the illustrated examples of the present embodiment, although no pleats remain in the sound insulation portion 15 in a state in which the sound insulation portion 15 is expanded as illustrated in FIGS. 1 and 2, the shape when the sound insulation portion 15 is expanded is not limited to this configuration, and some folds may remain in the sound insulation portion 15. In addition, as illustrated in FIG. 1 and FIG. 2, the circumference length of the outer peripheral edge 15*a* with the sound insulation portion 15 expanded is approximately the same as that of the outer peripheral edge 15*a* with the sound insulation portion 15 contracted as illustrated in FIG. 4 and FIG. 5.

The inner protector 30 illustrated in FIG. 3 is an annular member that supports the grommet body 11 and is held at the peripheral edge of the through-hole 2. The inner protector 30 is made of a material that is more rigid than the grommet body 11, such as resin. In addition, the inner protector 30 is constituted of a pair of members divided into two parts by a virtual plane including the center axis of the inner protector 30 itself, that is, a combination of a first inner member 31*a* and a second inner member 31*b*.

The inner protector 30 as a whole has a main body 32 which is an annular structure constituted of a plurality of walls, and the flanges 33 which are annular plates.

The main body 32 includes, for example, an outer peripheral wall 32*a*, an upper wall 32*b*, and an inner peripheral wall 32*c*. When the grommet 10 is attached to the peripheral edge of the through-hole 2, the outer peripheral wall 32*a* is a wall which is opposite to the peripheral edge of the through-hole 2 along the plane direction of the vehicle body panel 1. The upper wall 32*b* is a wall which is continuous with the upper and outer peripheral ends of the outer peripheral wall 32*a* and extends toward the inner peripheral side. The inner peripheral wall 32*c* is a wall which is continuous with the inner peripheral end of the upper wall 32*b* and approximately parallel to the outer peripheral wall 32*a*.

The flanges 33 protrude radially inward from the lower peripheral edge of the inner peripheral wall 32*c*. The flanges 33 are fitted into the fitting groove 16 when the inner protector 30 is connected to the grommet body 11, as described above. In addition, the flanges 33 have the convex portion 33*a* engaging with the recess 18 when fitted into the fitting groove 16 in accordance with the position of the recess 18 formed in advance in the fitting groove 16. The rotation of the inner protector 30 with respect to the grommet body 11 on the basis of the center axis of the large-diameter tubular portion 12 is suppressed because of the convex portion 33*a* engaging with the recess 18. The convex portion 33*a* may be formed in the respective flanges 33 of the first inner member 31*a* and the second inner member 31*b*. Meanwhile, the fitting groove 16 of the grommet body 11 may have the plurality of recesses 18 corresponding to the respective convex portions 33*a*.

Here, when the inner protector 30 is a combination of a pair of members of the first inner member 31*a* and the second inner member 31*b*, the first inner member 31*a* and the the second inner member 31*b* may have the same semicircular shape as each other. The first inner member 31*a* and the second inner member 31*b* also include two side walls 32*d* which abut against each other in the circumferential direction when combined with each other. Of the two side walls 32*d*, one side wall 32*d* is provided with a hook 34, and the other side wall 32*d* is provided with a groove 35. When the first inner member 31*a* and the second inner member 31*b* are combined, the hook 34 of the first inner member 31*a* is fitted into the groove 35 of the second inner member 31*b*, and the hook 34 of the second inner member 31*b* is fitted into the groove 35 of the first inner member 31*a*.

The first inner member 31*a* and the second inner member 31*b* may be connected via a hinge, for example, instead of the connection mechanism by means of the hook 34 and the groove 35. Although the case where the inner protector 30 is divided into two inner members is described as an example, it may be divided into three or more inner members.

Further, the inner protector 30 also has a plurality of inner locks 40 that lock the main body 32 to the periphery of the through-hole 2 when a part of the main body 32 is inserted into the through-hole 2. In the present embodiment, the inner locks 40 are provided at four positions at equal intervals in the circumferential direction as a whole of the inner protector 30. That is, the inner locks 40 are provided at two positions in the first inner member 31*a*, and also at two positions in the second inner member 31*b*. The number of inner locks 40 is not particularly limited and may be a number other than four.

Each inner lock 40 includes a lock hook 41.

The lock hook 41 is provided along the outer peripheral wall 32*a* of the main body 32 and elastically deforms in the direction connecting the inner side and the outer side of the outer peripheral wall 32*a*. The lock hook 41 has a protrusion which contacts or engages with the peripheral edge of the through-hole 2. Here, a state in which the protrusion engages with the peripheral edge of the through-hole 2 refers to the state of the protrusion with respect to the through-hole 2 when the inner locks 40 lock the main body 32 to the peripheral edge of the through-hole 2, that is, when the grommet 10 is attached to the peripheral edge of the through-hole 2. The protrusion protrudes outward with a ridgeline along the circumferential direction of the outer peripheral wall 32*a* as an apex and is usually positioned outside the outer periphery of the outer peripheral wall 32*a*. That is, the elastic deformation of the lock hook 41 is caused by the displacement of the protrusion due to the contact of the protrusion with the peripheral edge of the through-hole 2. In addition, in a state in which the protrusion is engaged with the peripheral edge of the through-hole 2, when the peripheral edge of the through-hole 2 enters the lower end groove of the protrusion, the main body 32 is maintained in a fixed position with respect to the peripheral edge of the through-hole 2.

In the inner protector 30, since the inner locks 40 are provided at four positions in the circumferential direction, each protrusion included in a total of the four lock hooks 41 protrudes along the radial direction based on the central axis of the main body 32.

Next, the operation of the grommet 10 will be described.

First, regarding the assembly of the grommet 10, an operator prepares the grommet body 11 with the electric wire W being arranged on the inner peripheral side, and attaches the inner protector 30 to the large-diameter tubular portion 12 of the grommet body 11. Here, the inner protector 30 is divided in advance into the first inner member 31*a* and the second inner member 31*b*. For this reason, when the electric wire W has already penetrated through the through-hole 2 provided in the vehicle body panel 1, the inner protector 30 can be easily attached to the large-diameter tubular portion 12 of the grommet body 11 by combining each of the inner members so as to sandwich the large-diameter tubular portion 12 of the grommet body 11 from both sides. The above operation makes it possible for the grommet 10 to be attached to the electric wire W.

Next, regarding the attachment of the grommet 10 to the peripheral edge of the through-hole 2, when the electric wire W has not yet penetrated through the through-hole 2, the operator passes the electric wire W, which is exposed from the second small-diameter tubular portion 14 side of the grommet body 11, through the through-hole 2. Next, the operator pushes the entire grommet 10 to the through-hole 2 side by inserting the main body 32 of the inner protector 30 into the through-hole 2. At this time, each lock hook 41 of the inner locks 40 is elastically deformed because the protrusions are displaced while contacting the peripheral edge of the through-hole 2, thereby allowing the insertion of the main body 32 into the through-hole 2. When the main body 32 is inserted up to the insertion completion position, each lock hook 41 is elastically restored to be locked to the peripheral edge of the through-hole 2. When the inner protector 30 is in a locked state as above, the lip 17 of the grommet body 11 adheres closely to the peripheral edge surface of the through-hole 2 provided on the surface of the vehicle body panel 1. That is, the vehicle body panel 1 is sandwiched between the protrusions of the inner protector 30 side and the lip 17 of the grommet body 11 side. Thus, the grommet 10 is attached to the peripheral edge of the through-hole 2 so as to close the through-hole 2.

Further, in the attachment of the grommet 10, the umbrella-like sound insulation portion 15 is in a state such that the abutting side surface 15*b* of the sound insulation portion 15 is folded back in such a way as to face the radial outer side of the grommet body 11 with the fold-back portion 22 as the base point (see FIGS. 4 and 5). The sound insulation portion 15 in a state in which the abutting side surface 15*b* of the sound insulation portion 15 is folded back in such a way as to face the radial outer side of the grommet body 11 has a pleated shape having a plurality of pleats 23 in the circumferential direction, and the outer diameter D1 of the sound insulation portion 15 in this state is smaller than the inner diameter D2 of the through-hole 2. For this reason, by inserting the grommet 10 into the through-hole 2 with the sound insulation portion 15 contracted as illustrated in FIGS. 4 and 5, interference of the sound insulation portion 15 with the peripheral edge of the through-hole 2 is suppressed, thereby allowing the grommet 10 to be easily inserted into the through-hole 2. After the grommet 10 is attached to the peripheral edge of the through-hole 2 as described above, the sound insulation portion 15 is expanded by bending in the direction of the vehicle body panel 1, thereby making the outer peripheral edge 15*a* of the sound insulation portion 15 adhere closely to the peripheral edge surface of the through-hole 2 provided on the surface of the vehicle body panel 1.

Next, the effect of the grommet 10 will be described.

The grommet 10 according to a first aspect of the present embodiment is provided with the grommet body 11 for holding, at the inner periphery side, the electric wire W penetrating through the through-hole 2 provided in the member to which attachment is performed (vehicle body panel 1). The grommet body 11 includes the large-diameter tubular portion 12 locked to the peripheral edge of the through-hole 2, the first small-diameter tubular portion 13 arranged on one side of the opening of the through-hole 2, and the second small-diameter tubular portion 14 arranged on the other side of the opening of the through-hole 2. The grommet body 11 includes the umbrella-like sound insulation portion 15, which extends from the inner peripheral side to the outer peripheral side of the grommet body 11 and covers the opening of the through-hole 2 from the other side. The sound insulation portion 15 is configured such that the inner-side surface of the sound insulation portion 15 (abutting side surface 15b) is folded back in such a way as to face the radial outer side of the grommet body 11 with the fold-back portion 22 as the base point. The sound insulation portion 15 in a state in which the inner-side surface of the sound insulation portion 15 (abutting side surface 15b) is folded back in such a way as to face the radial outer side of the grommet body 11 has a pleated shape having a plurality of pleats 23 in the circumferential direction, and the outer diameter D1 of the sound insulation portion 15 in this state is smaller than the inner diameter D2 of the through-hole 2.

The sound insulation portion 15 is formed in an umbrella-like or a flange-like shape extending from the outer surface of the second enlarging-diameter tubular portion 21, and the outer diameter of the sound insulation portion 15 in a state in which the sound insulation portion 15 is expanded as illustrated in FIG. 1 and FIG. 2 is larger than the inner diameter D2 of the through-hole 2. Meanwhile, the sound insulation portion 15 in a state in which the abutting side surface 15b of the sound insulation portion 15 is folded back in such a way as to face the radial outer side of the grommet body 11 has a pleated shape having a plurality of pleats 23 in the circumferential direction, and the outer diameter D1 of the sound insulation portion 15 in this state is smaller than the inner diameter D2 of the through-hole 2. For this reason, by inserting the grommet 10 into the through-hole 2 with the sound insulation portion 15 contracted as illustrated in FIG. 4 and FIG. 5, interference of the sound insulation portion 15 with the peripheral edge of the through-hole 2 is suppressed, thereby allowing the grommet 10 to be easily inserted into the through-hole 2.

As described above, the present embodiment makes it possible to provide the grommet 10, which is capable of suppressing interference with the vehicle body panel 1 when the grommet 10 is attached to the peripheral edge of the through-hole 2 and thus is advantageous in improving the workability when the grommet 10 is attached to the peripheral edge of the through-hole 2.

In the grommet 10 according to a second aspect of the present embodiment, the fold-back portion 22 is provided at a position further away from the member to which attachment is performed (vehicle body panel 1) than the outer peripheral edge 15a of the sound insulation portion 15 in the length direction of the grommet body 11.

By making the position where the abutting side surface 15b of the sound insulation portion 15 is folded to be high with respect to the outer peripheral edge 15a, it is possible to make it difficult for the sound insulation portion 15 to return from the expanded state as illustrated in FIG. 1 and FIG. 2 to the contracted state as illustrated in FIG. 4 and FIG. 5. In addition, in a state in which the sound insulation portion 15 is expanded, sufficient force for pressing the vehicle body panel 1 using the outer peripheral edge 15a of the sound insulation portion 15 can be obtained, thereby making the outer peripheral edge 15a of the sound insulation portion 15 adhere closely to the peripheral edge surface of the through-hole 2.

In the grommet 10 according to a third aspect of the present embodiment, the expanding-diameter tubular portion (second enlarging-diameter tubular portion 21) is provided between the second small-diameter tubular portion 14 and the large-diameter tubular portion 12, and the sound insulation portion 15 is formed in such a way as to extend from the outer surface of the second small-diameter tubular portion 14 or the expanding-diameter tubular portion (second enlarging-diameter tubular portion 21). The annular groove 25 extending along the circumferential direction of the grommet body 11 is formed between the outer surface of the second small-diameter tubular portion 14 or the expanding-diameter tubular portion (second enlarging-diameter tubular portion 21) and the outer peripheral surface of the sound insulation portion 15 (non-abutting side surface 15d).

The annular groove 25 is provided between the outer surface of the second small-diameter tubular portion 14 or the second enlarging-diameter tubular portion 21 and the non-abutting side surface 15d of the sound insulation portion 15. Accordingly, when the sound insulation portion 15 is reversed from a contracted state to an expanded state, a portion of the base end of the sound insulation portion 15 which is about to change into an elliptical shape can be released by the annular groove 25, and thus the force when the sound insulation portion 15 is reversed can be reduced. In addition, even when the inner wire W is moved in a state in which the grommet 10 is attached to the electric wire W, the movement of the electric wire W is not easily transmitted to the entire sound insulation portion 15, thereby making it difficult for the sound insulation portion 15 to return from the expanded state to the contracted state.

A wire harness according to the present embodiment is provided with the grommet 10 according to any one of the first to third aspects described above.

The present embodiment makes it possible to provide a wire harness which is capable of suppressing interference with the vehicle body panel 1 when the grommet 10 is attached to the peripheral edge of the through-hole 2 and thus is advantageous in improving the workability when the grommet 10 is attached to the peripheral edge of the through-hole 2.

Second Embodiment

Next, a grommet 10A according to the second embodiment will be described. It should be noted that the components substantially identical to those of the grommet 10 described above are denoted by the same reference numbers, and a description thereof is omitted.

Figure 6:
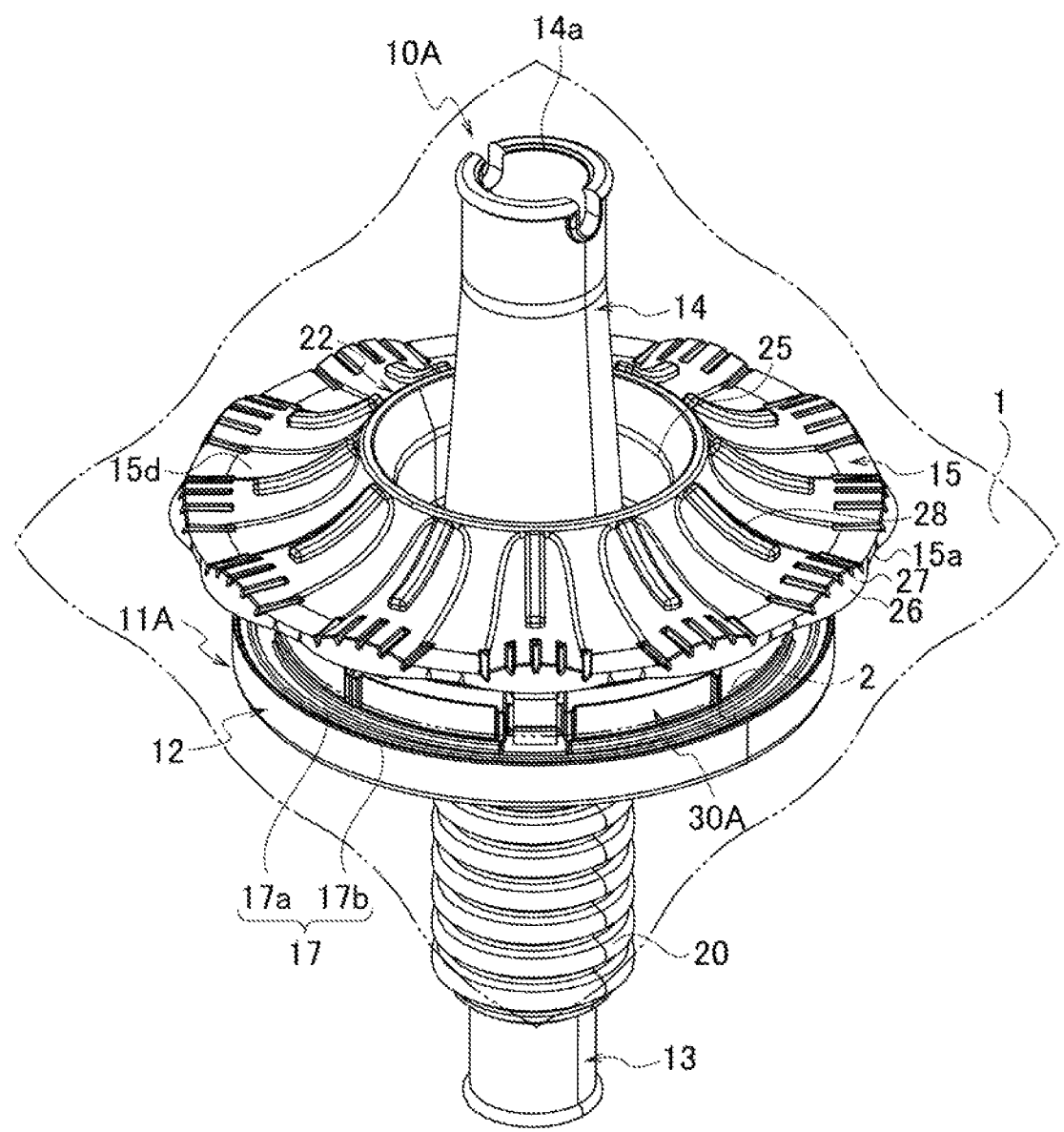
FIG. 6 is a perspective view illustrating an example of a grommet according to a second embodiment.
Figure 7:
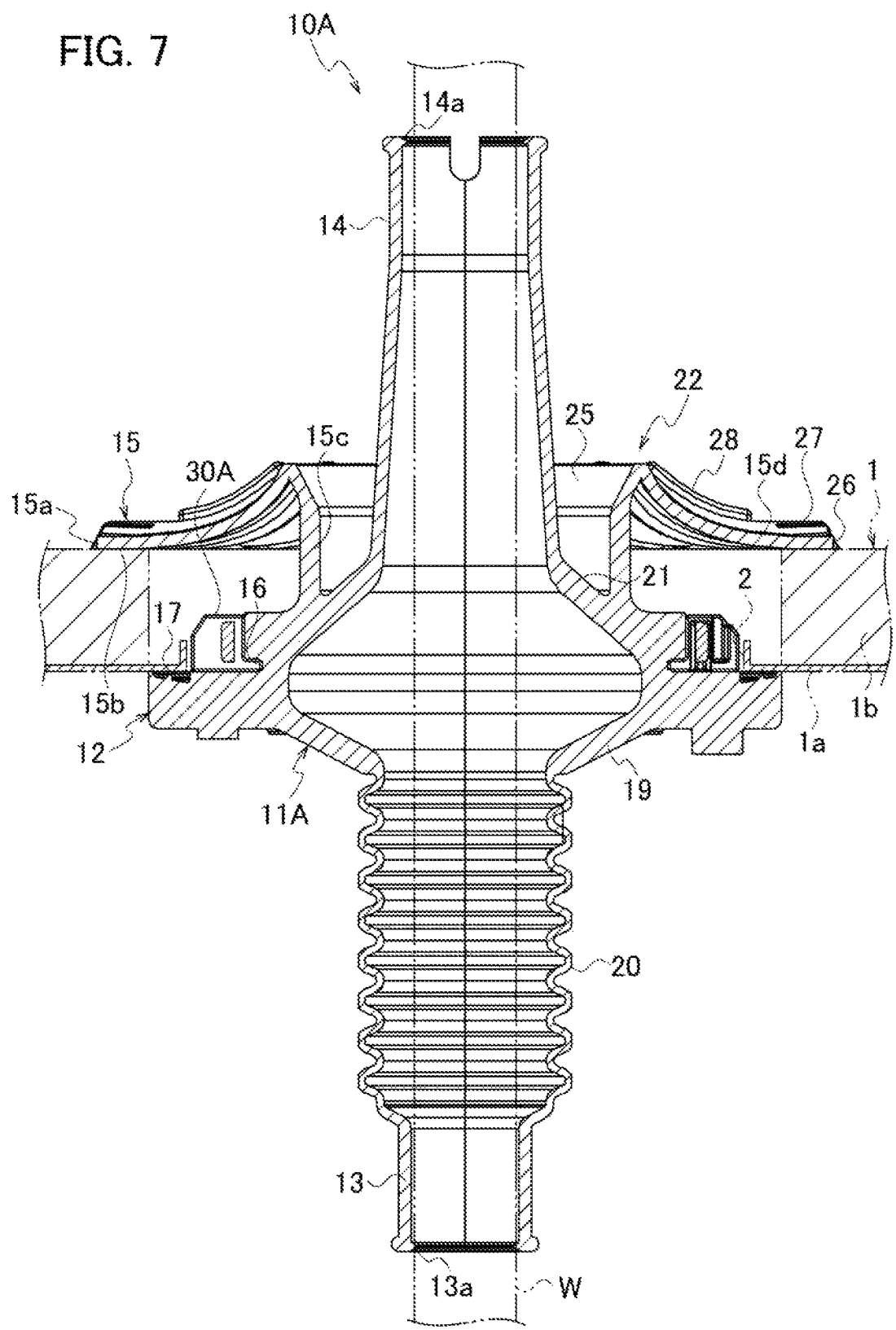
FIG. 7 is a cross-sectional view of the grommet according to the second embodiment.
Figure 8:
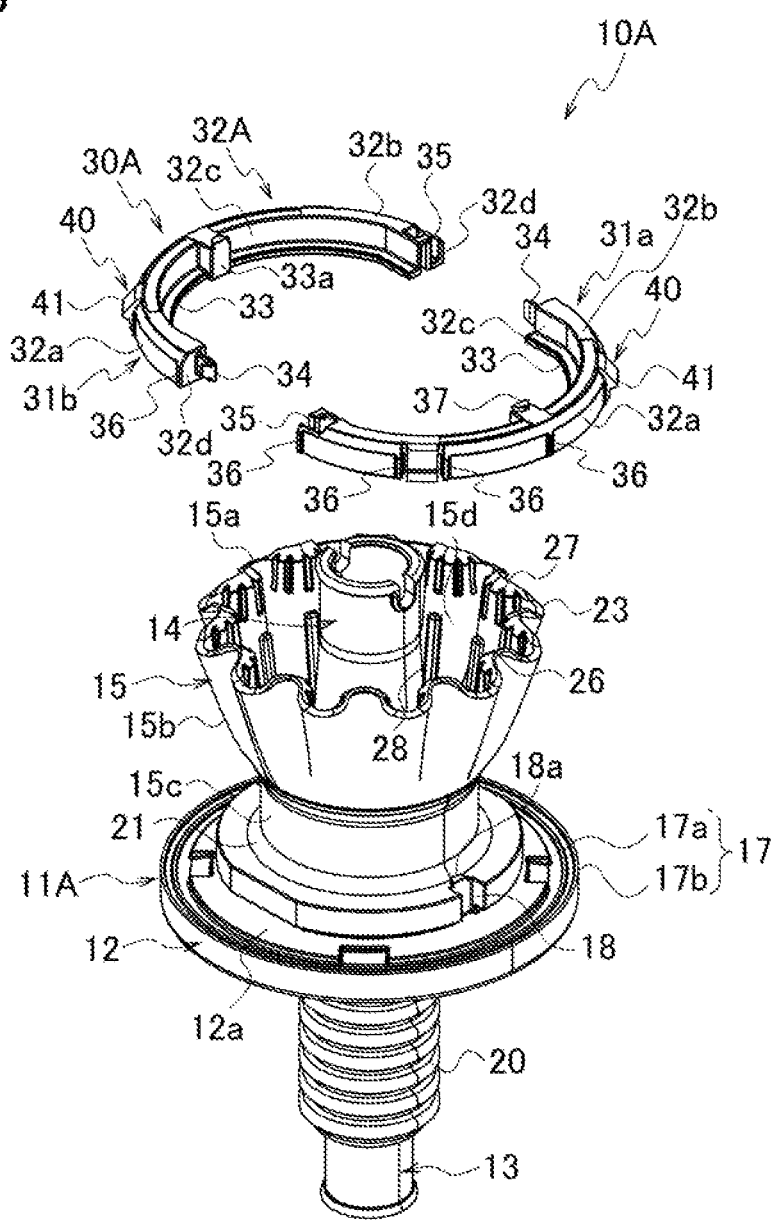
FIG. 8 is an exploded view of the grommet according to the second embodiment.
Figure 9:
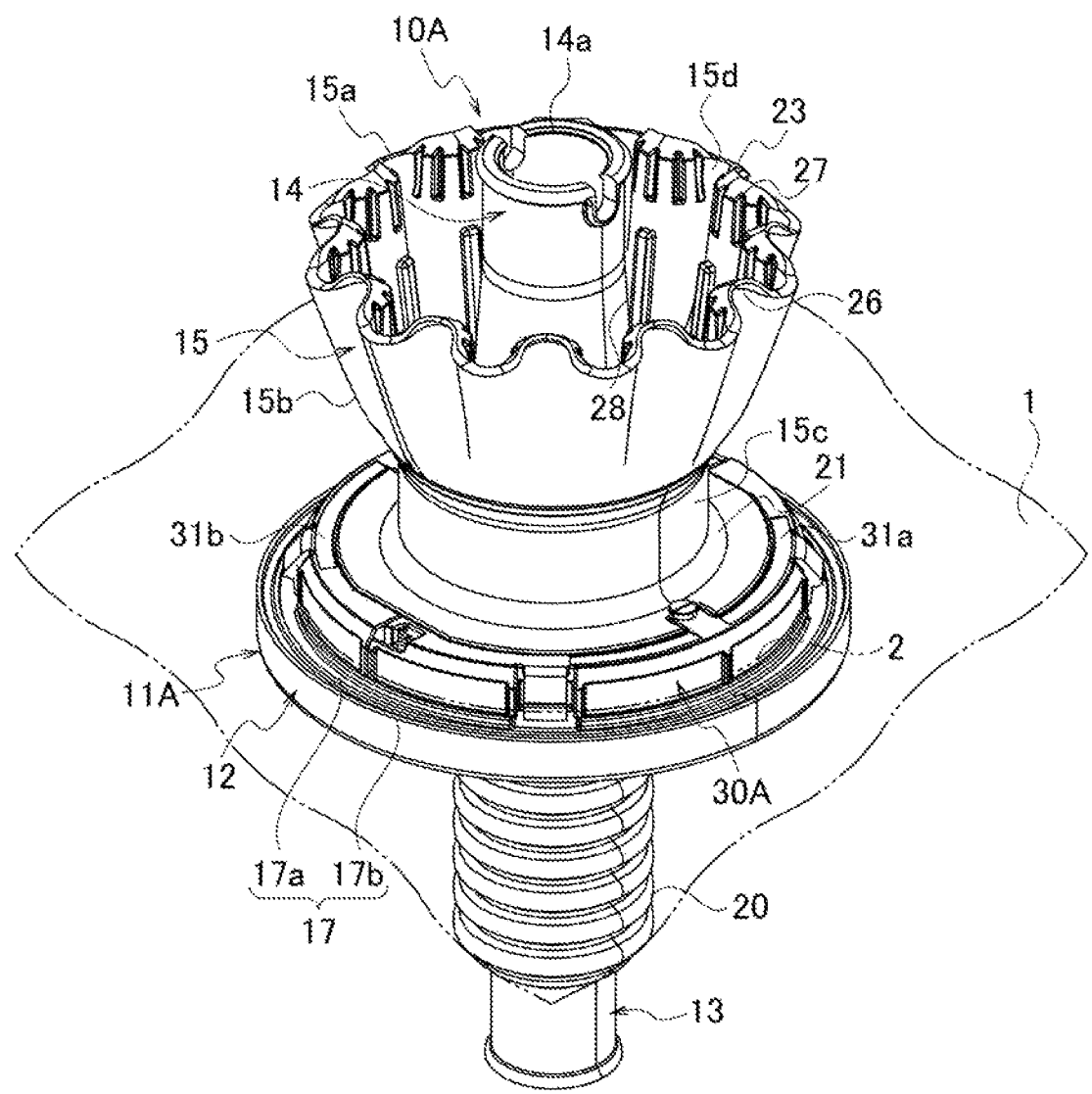
FIG. 9 is a perspective view illustrating a state in which an umbrella-like sound insulation portion in the second embodiment is folded back.
Figure 10:
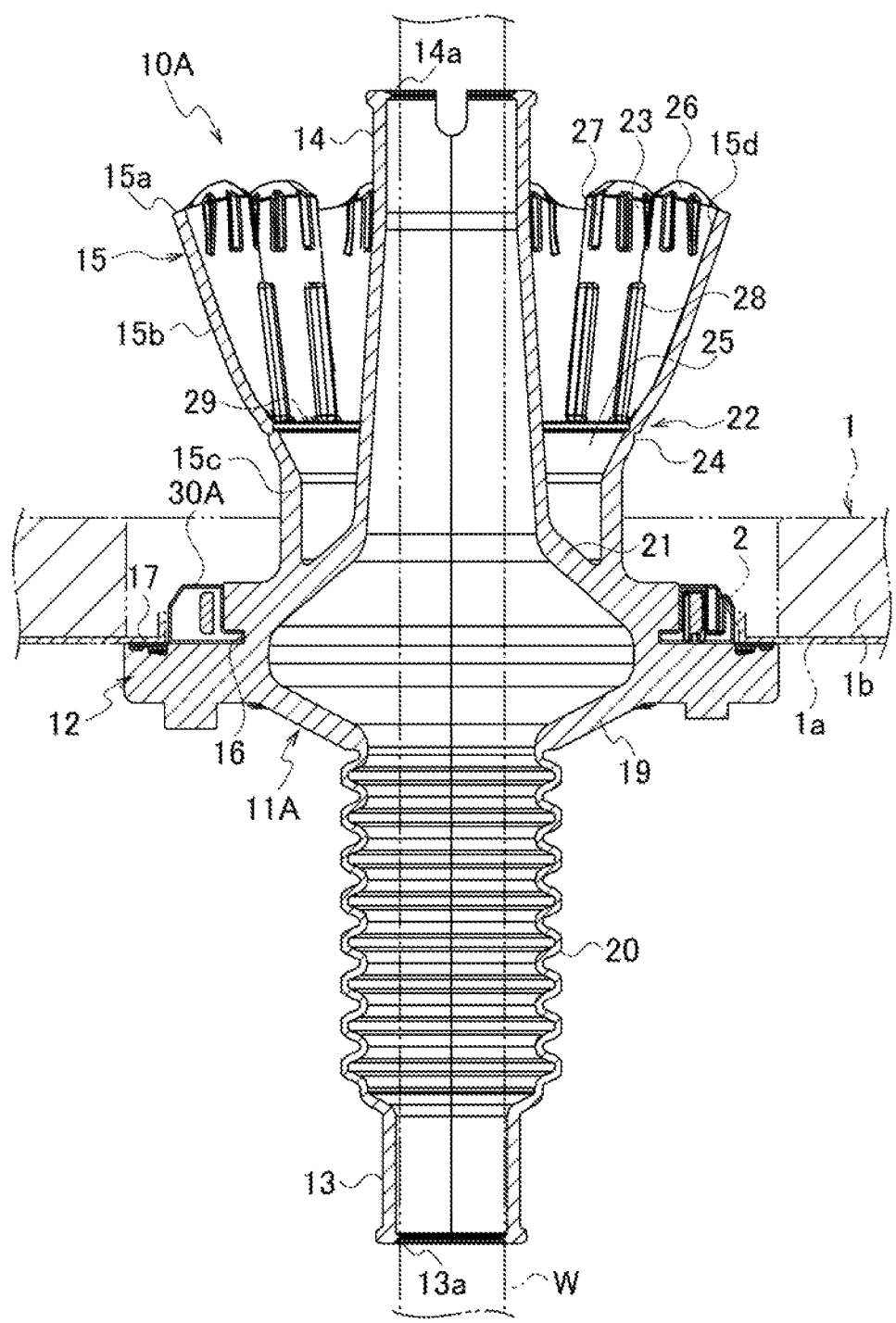
FIG. 10 is a cross-sectional view illustrating a state in which the umbrella-like sound insulation portion in the second embodiment is folded back.

FIG. 6 is a perspective view of the grommet 10A according to the second embodiment, and FIG. 7 is a cross-sectional view of the grommet 10A according to the second embodiment. FIG. 8 is an exploded view of the grommet 10A. Further, FIG. 9 is a perspective view illustrating a state in which an umbrella-like sound insulation portion 15 in the second embodiment is contracted from an expanded state, and FIG. 10 is a cross-sectional view illustrating a state in which the umbrella-like sound insulation portion 15 in the second embodiment is contracted from an expanded state.

In the grommet 10A according to the present embodiment, the outer peripheral edge 15a of the sound insulation portion 15 is provided with a closing portion 26 so as to close the gap between the vehicle body panel 1 and the outer peripheral edge 15a of the sound insulation portion 15 when the sound insulation portion 15 is expanded as illustrated in FIG. 6 and FIG. 7. In the present embodiment, a few pleats remain in the sound insulation portion 15, and a plurality of closing portions 26 are provided in the circumferential direction of the grommet body 11A with respect to the outer peripheral edge 15a of the sound insulation portion 15 so as to close the gap that may occur between the vehicle body panel 1 and the outer peripheral edge 15a of the sound insulation portion 15. In addition, the closing portions 26 may be provided in the crest portions of the pleats 23 in the sound insulation portion 15. The grommet 10A according to the present embodiment makes it possible to improve the sound insulation property of the sound insulation portion 15 by means of the closing portion 26 closing the gap between the vehicle body panel 1 and the outer peripheral edge 15a of the sound insulation portion 15 when the umbrella-like sound insulation portion 15 is expanded.

Further, in the grommet 10A according to the present embodiment, a groove 27 extending in the radial direction of the grommet body 11A is provided in the non-abutting side surface 15d near the outer peripheral edge 15a in the sound insulation portion 15. In the present embodiment, a plurality of grooves 27 are provided at intervals in the circumferential direction of the grommet body 11A with respect to the outer peripheral edge 15a of the sound insulation portion 15 provided with the closing portion 26. In addition, the grooves 27 may be provided in the crest portions of the pleats 23 in the sound insulation portion 15. The grommet 10A according to the present embodiment makes it possible to enhance the flexibility of the umbrella-like sound insulation portion 15 by providing the grooves 27 in the non-abutting side surface 15d of the sound insulation portion 15, thereby minimizing the gap that may occur between the vehicle body panel 1 and the grommet 10A.

Further, in the grommet 10A according to the present embodiment, a rib 28 extending along the radial direction of the grommet body 11A is provided on the non-abutting side surface 15d of the sound insulation portion 15. In the present embodiment, a plurality of ribs 28 are provided on the non-abutting side surface 15d of the sound insulation portion 15 at intervals in the circumferential direction of the grommet body 11A. In addition, the ribs 28 may be provided in the crest portions of the pleats 23 in the sound insulation portion 15. The grommet 10A according to the present embodiment makes it possible to increase the rigidity of the umbrella-like sound insulation portion 15 by providing the ribs 28 on the non-abutting side surface 15d of the sound insulation portion 15, thereby suppressing the sound insulation portion 15 from being recessed toward the through-hole 2 side when the sound insulation portion 15 is expanded.

Further, in the grommet 10A according to the present embodiment, the fold-back portion 22 includes a first fold-back groove 24 formed along the circumferential direction in the abutting side surface 15b of the sound insulation portion 15 and a second fold-back groove 29 formed along the circumferential direction in the non-abutting side surface 15d of the sound insulation portion 15. That is, the first fold-back groove 24 is provided in the abutting side surface 15b of the sound insulation portion 15 in order to make a part of the abutting side surface 15b of the sound insulation portion 15 thin and to make it easier to be folded in a direction toward the peripheral edge surface of the through-hole 2. Meanwhile, the second fold-back groove 29 is provided in the non-abutting side surface 15d of the sound insulation portion 15 in order to make a part of the non-abutting side surface 15d of the sound insulation portion 15 thin and to make it easier to be folded in a direction toward the peripheral edge surface of the through-hole 2. The grommet 10A according to the present embodiment makes it possible to fix the base point when the sound insulation portion 15 is folded back because the fold-back portion 22 includes the first fold-back groove 24 in the abutting side surface 15b side of the sound insulation portion 15 and the second folding groove 29 in the non-abutting side surface 15d side of the sound insulation portion 15.

As illustrated in FIG. 8, ribs 36 are provided on the outer peripheral wall 32a in a main body 32A of the inner protector 30A so as to suppress the inner protector 30A from being attached to the grommet body 11A in an inclined state. In the grommet 10A according to the present embodiment, pairs of ribs 36 and 36 provided with a lock hook 41 therebetween are formed on the outer peripheral wall 32a of the main body 32A of the inner protector 30A, and ribs 36 which are provided at an intermediate position between the lock hooks 41 adjacent to each other in the circumferential direction are also formed on the outer peripheral wall 32a of the main body 32A of the inner protector 30A. The grommet 10A according to the present embodiment makes it possible to reduce the load that is generated when the inner peripheral surface of the through-hole 2 abuts on the ribs 36 and is applied to the lock hooks 41, because the inner protector 30A has the ribs 36 for suppressing inclination.

Further, the large-diameter tubular portion 12 of the grommet body 11A and the main body 32A of the inner protector 30A are respectively provided with positioning protrusions 18a and 37, which suppress the inner protector 30A from being attached to the grommet body 11A in an incorrect orientation. In the grommet 10A according to the present embodiment, the positioning protrusion 37 on the inner protector 30A side is formed in a semicircular shape and provided on the upper surface of the tip of the convex portion 33a. Meanwhile, the positioning protrusion 18a on the grommet body 11A side is formed in a semicircular shape and provided near the recess 18 in the large-diameter tubular portion 12 of the grommet body 11A. In the grommet 10A according to the present embodiment, the grommet body 11A and the inner protector 30A respectively include the positioning protrusion 18a and the positioning protrusion 37 which are configured to suppress incorrect attachment. This configuration makes it possible to suppress the inner protector 30A from being attached to the grommet body 11A in a state where the inner protector 30A is incorrectly oriented with respect to the length direction (vertical direction) of the grommet body 11A. In addition, by visually confirming that the positioning protrusion 37 on the inner protector 30A side abuts against the positioning protrusion 18a on the grommet body 11A side, it is possible to suppress incorrect attachment of the inner protector 30A.

As in the case of the grommet 10 described above, the grommet 10A illustrated in FIG. 6 to FIG. 10 makes it possible to suppress interference with the vehicle body panel 1 when the grommet 10A is attached to the peripheral edge of the through-hole 2, thereby improving the workability when the grommet 10A is attached to the peripheral edge of the through-hole 2.

Third Embodiment

Next, a grommet 10B according to the third embodiment will be described. It should be noted that the components substantially identical to those of the grommet 10 and the grommet 10A described above are denoted by the same reference numbers, and a description thereof is omitted.

Figure 11:
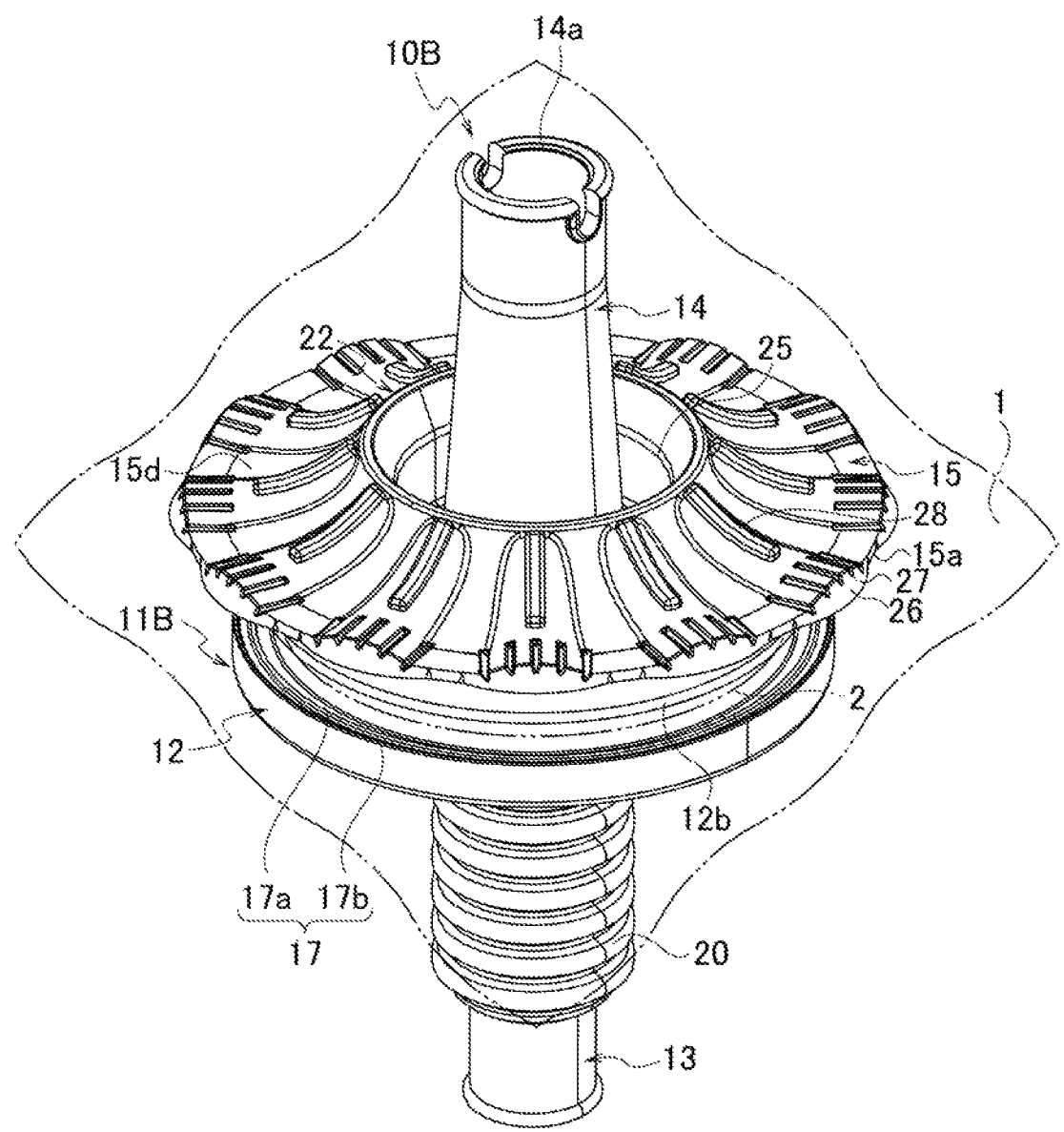
FIG. 11 is a perspective view illustrating an example of a grommet according to a third embodiment.
Figure 12:
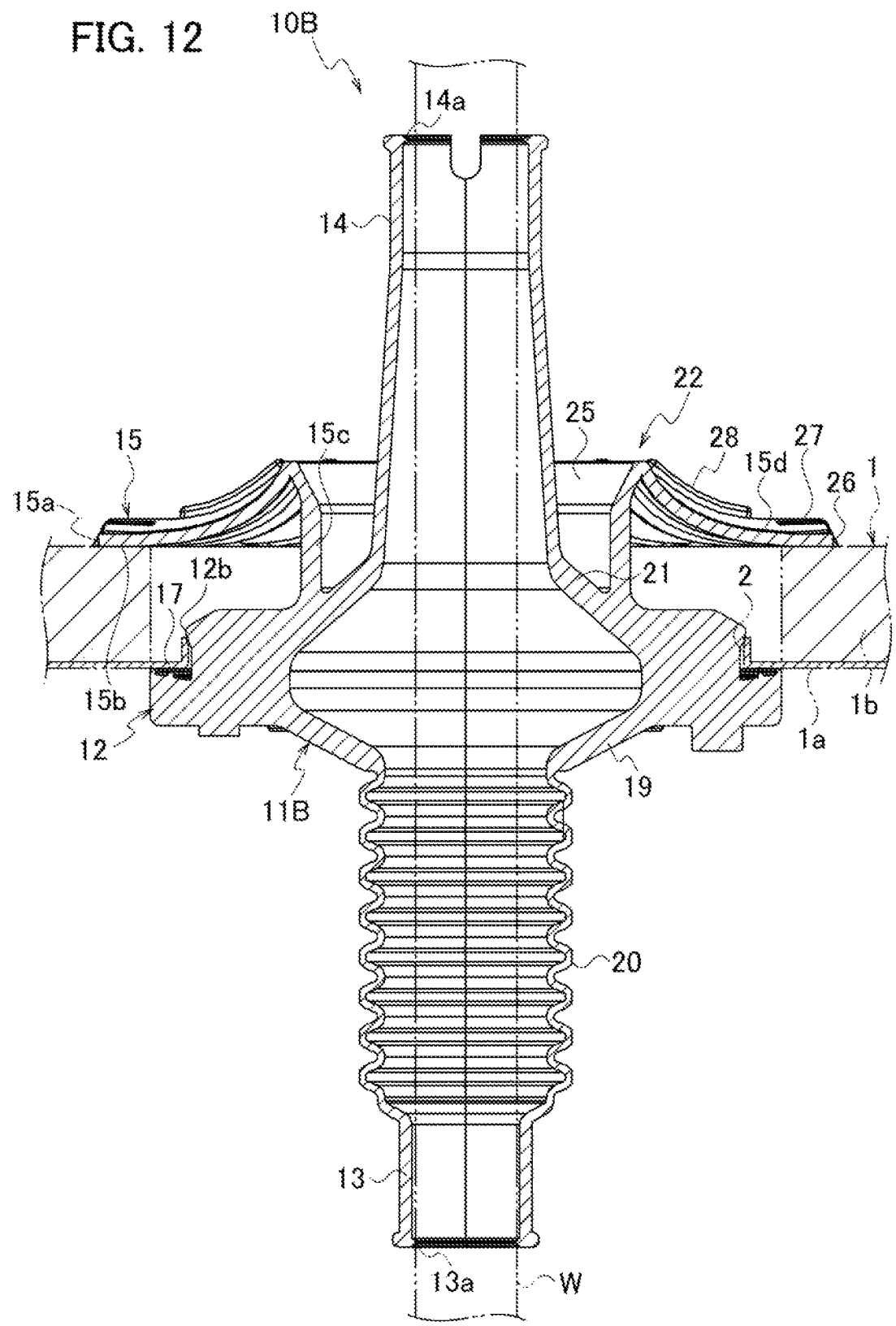
FIG. 12 is a cross-sectional view of the grommet according to the third embodiment.
Figure 13:
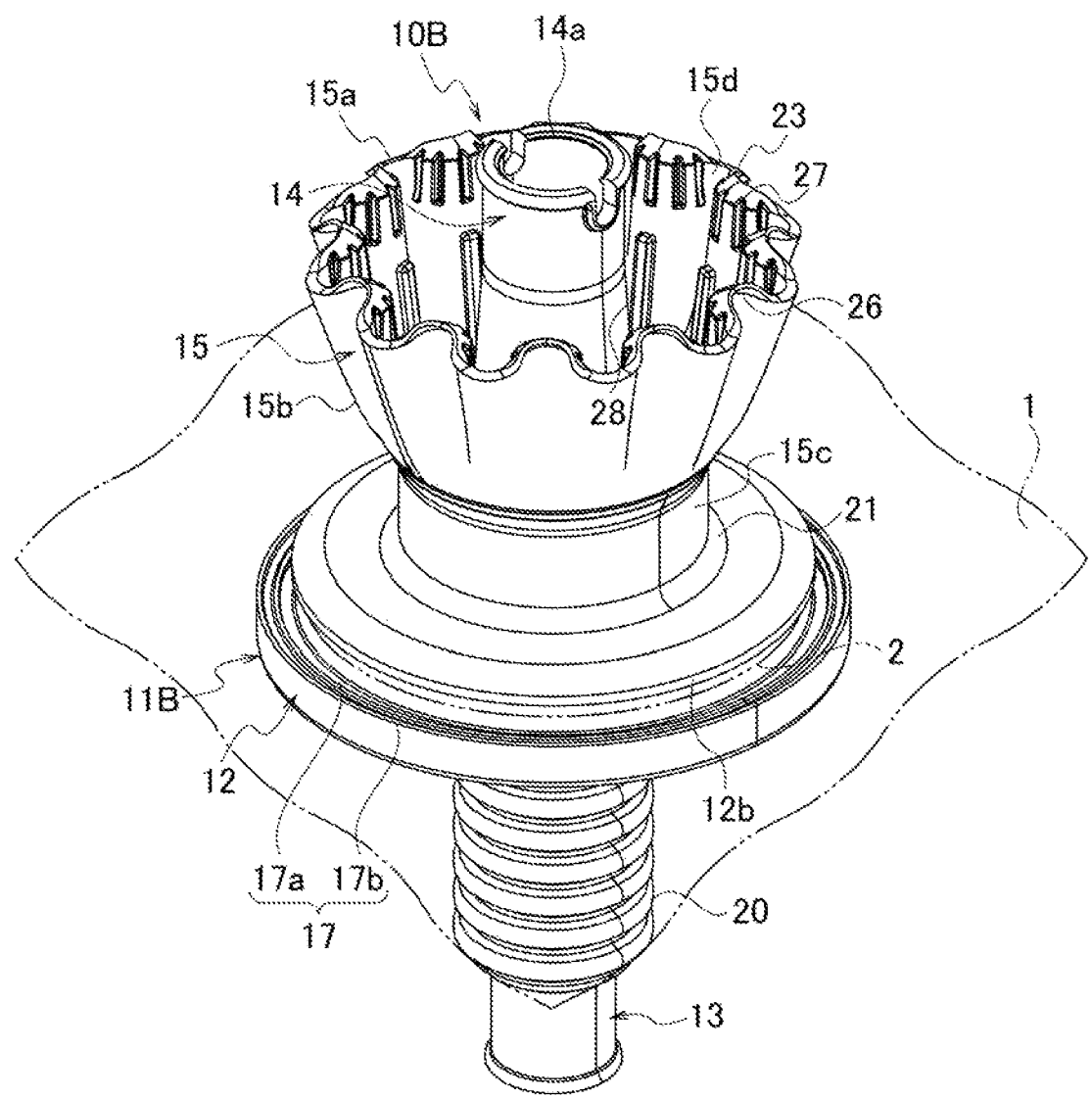
FIG. 13 is a perspective view illustrating a state in which an umbrella-like sound insulation portion in the third embodiment is folded back.
Figure 14:
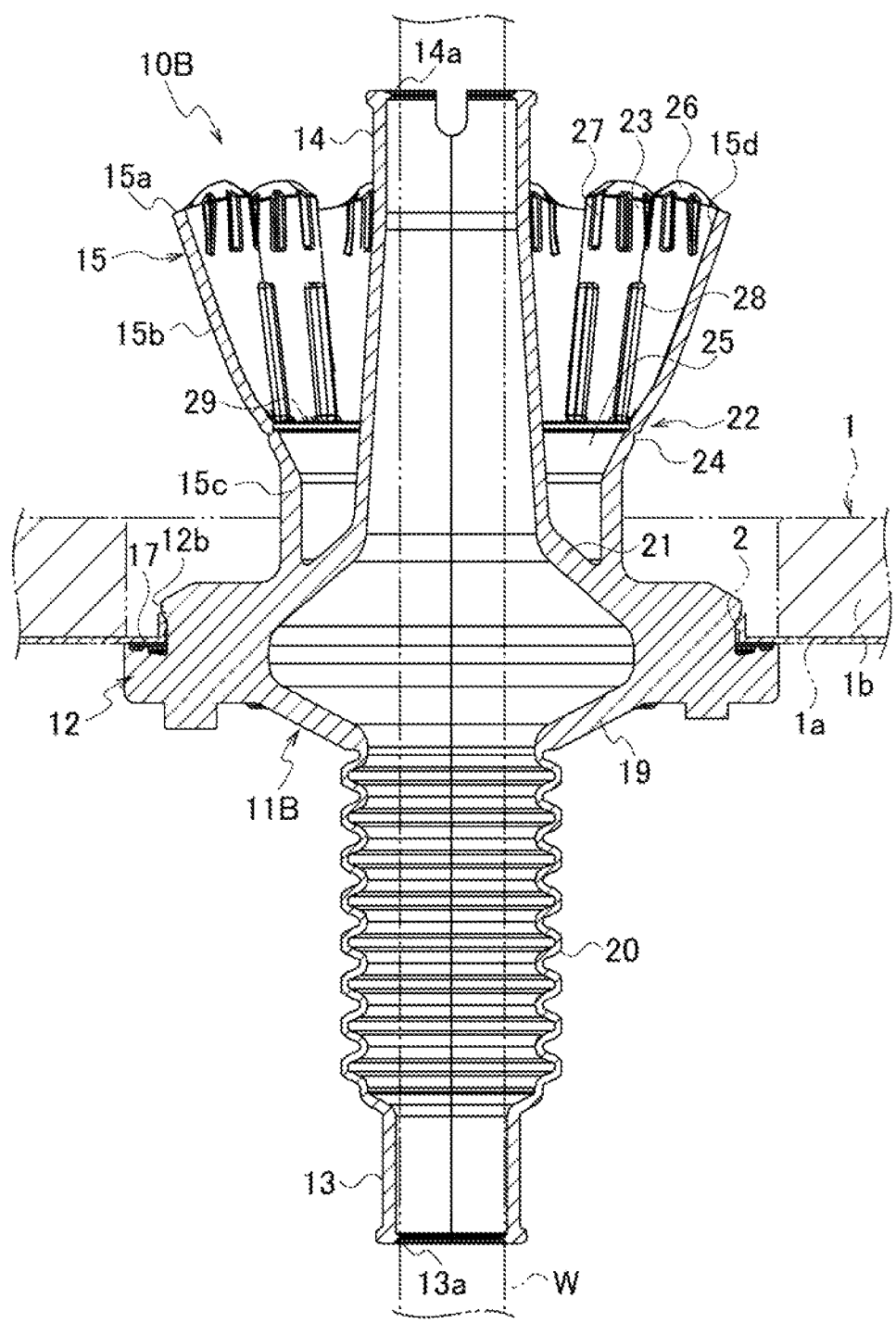
FIG. 14 is a cross-sectional view illustrating a state in which the umbrella-like sound insulation portion in the third embodiment is folded back.

FIG. 11 is a perspective view of the grommet 10B according to the third embodiment, and FIG. 12 is a cross-sectional view of the grommet 10B according to the third embodiment. Further, FIG. 13 is a perspective view illustrating a state in which an umbrella-like sound insulation portion 15 in the third embodiment is contracted from an expanded state, and FIG. 14 is a cross-sectional view illustrating a state in which the umbrella-like sound insulation portion 15 in the third embodiment is contracted from an expanded state.

As illustrated in FIG. 11 to FIG. 14, the grommet 10B according to the present embodiment does not include an inner protector, and the grommet body 11B is attached directly to the peripheral edge of the through-hole 2. An annular wall 12b is formed along the circumferential direction of the grommet body 11B on the outer periphery portion of the large-diameter tubular portion 12 of the grommet body 11B.

As in the case of the grommet 10 and the grommet 10A described above, the grommet 10B illustrated in FIG. 11 to FIG. 14 makes it possible to suppress interference with the vehicle body panel 1 when the grommet 10B is attached to the peripheral edge of the through-hole 2, thereby improving the workability when the grommet 10B is attached to the peripheral edge of the through-hole 2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A grommet comprising a grommet body for holding, at an inner periphery side, an electric wire penetrating through a through-hole provided in a member to which attachment is performed, the grommet body comprising:
    a large-diameter tubular portion locked to a peripheral edge of the through-hole;
    a first small-diameter tubular portion arranged on one side of an opening of the through-hole;
    a second small-diameter tubular portion arranged on another side of the opening of the through-hole; and
    an umbrella-like sound insulation portion which extends from an inner peripheral side to an outer peripheral side of the grommet body and covers the opening of the through-hole from another side, wherein
    the sound insulation portion is configured such that the sound insulation portion is able to be folded back in such a way that an inner-side surface of the sound insulation portion faces a radial outer side of the grommet body with a folded-back portion as a base point, and
    the sound insulation portion in a state in which the inner-side surface of the sound insulation portion is folded back in such a way as to face the radial outer side of the grommet body has a pleated shape having a plurality of pleats in a circumferential direction, and an outer diameter of the sound insulation portion in this state is smaller than an inner diameter of the through-hole.

2. The grommet according to claim 1, wherein
    the folded-back portion is provided at a position further away from the member to which attachment is performed than an outer peripheral edge of the sound insulation portion in a length direction of the grommet body.

3. The grommet according to claim 1, wherein
    an expanding-diameter tubular portion is provided between the second small-diameter tubular portion and the large-diameter tubular portion,
    the sound insulation portion is formed in such a way as to extend from an outer surface of the second small-diameter tubular portion or the expanding-diameter tubular portion, and
    an annular groove extending along a circumferential direction of the grommet body is formed between the outer surface of the second small-diameter tubular portion or the expanding-diameter tubular portion and an outer-side surface of the sound insulation portion.

4. The grommet according to claim 1, wherein
    an outer peripheral edge of the sound insulation portion is provided with a closing portion so as to close a gap between the member to which attachment is performed and the outer peripheral edge of the sound insulation portion.

5. The grommet according to claim 1, wherein
    a groove extending in a radial direction of the grommet body is provided in an outer-side surface near the outer peripheral edge in the sound insulation portion.

6. The grommet according to claim 1, wherein
    a rib extending in a radial direction of the grommet body is provided on an outer-side surface of the sound insulation portion.

7. A wire harness comprising the grommet according to claim 1.

* * * * *